United States Patent
Ross

(10) Patent No.: US 6,799,926 B1
(45) Date of Patent: Oct. 5, 2004

(54) CARGO HANDLING APPARATUS

(76) Inventor: Ralph Barclay Ross, Pitmedden Road, Dyce, Aberdeen, AB21 0HB (GB)

( * ) Notice: Subject to any disclaimer, the term of this patent is extended or adjusted under 35 U.S.C. 154(b) by 0 days.

(21) Appl. No.: 09/889,834

(22) PCT Filed: Jan. 24, 2000

(86) PCT No.: PCT/GB00/00176
§ 371 (c)(1),
(2), (4) Date: Nov. 28, 2001

(87) PCT Pub. No.: WO00/43295
PCT Pub. Date: Jul. 27, 2000

(30) Foreign Application Priority Data

Jan. 23, 1999 (GB) ............................................. 9901474

(51) Int. Cl.$^7$ ................................................. B60P 7/08
(52) U.S. Cl. ............................ 410/36; 410/34; 410/35; 410/37; 410/38; 410/42
(58) Field of Search ............................ 410/32, 34, 35, 410/36–40, 42, 46; 211/59.4, 70.4; 206/443; 248/68.1

(56) References Cited

U.S. PATENT DOCUMENTS

| | | | | |
|---|---|---|---|---|
| 1,342,654 A | * | 6/1920 | Torgerson | ..................... 410/37 |
| 1,793,059 A | * | 2/1931 | Chambers | ..................... 410/36 |
| 1,799,628 A | * | 4/1931 | Knowles | ....................... 410/37 |
| 2,248,119 A | * | 7/1941 | Reed et al. | .................... 410/35 |
| 2,404,531 A | * | 7/1946 | Robertson | |
| 2,849,027 A | * | 8/1958 | Tetyak | |
| 3,204,983 A | * | 9/1965 | Rehnstrom et al. | ........... 410/37 |
| 3,237,786 A | * | 3/1966 | Millilen | |
| 4,380,297 A | | 4/1983 | Frias | |
| 5,188,503 A | * | 2/1993 | Appelberg | |
| 5,294,222 A | | 3/1994 | Smith | ........................... 410/36 |
| 5,964,557 A | * | 10/1999 | Eng | ............................. 410/37 |
| 6,164,883 A | * | 12/2000 | Wilcox | ......................... 410/36 |
| 6,261,037 B1 | * | 7/2001 | Richards et al. | .............. 410/36 |

FOREIGN PATENT DOCUMENTS

| | | |
|---|---|---|
| EP | 0447382 | 9/1991 |
| EP | 0462086 | 12/1991 |
| FR | 2738219 | 3/1997 |

* cited by examiner

Primary Examiner—Stephen Gordon
(74) Attorney, Agent, or Firm—Gifford, Krass, Groh, Sprinkle, Anderson & Citkowski, P.C.

(57) ABSTRACT

Apparatus for packaging elongate members, such as drill-pipe (40) and downhole tubulars, comprises a frame comprising a base (6) and side members (2), and packing members (23) for engaging with the side members (2). The packing members (23) have a deformable portion (22) for engaging elongate members to be handled. Tie down chains (19) or other retainers hold the packing members (23) in contact with the elongate members (40).

22 Claims, 5 Drawing Sheets

CARGO HANDLING APPARATUS

The present invention relates to cargo handling apparatus, particularly apparatus for packaging elongate members. The invention has particular application in handling lengths of drill pipe, and other downhole tubulars, such as casing and liner.

Drilling boreholes by rotary drilling usually involves use of a drillstring with a drillbit at the distal end, and a motor at the rig end. The drillstring is conventionally made up of many drillpipe sections which are connected together by threaded box and pin connections. The drillpipe sections are typically 9.5–13.1 metres (31–43') long, are relatively heavy, and require careful handling.

For storing and transporting drillpipe and other tubulars it is known to stack tubular lengths in cuboid bundles. The bundles are formed using perhaps four U-frames, with spacers being located between the arms of the U-frames and having upper and lower faces profiled to cooperate with tubular lengths of a particular diameter. The U-frames are spaced along the bundle and the bundle is lifted by slings or the like coupled to the U-frames. Accordingly, the spacers must be selected to suit the particular drillpipe dimensions, such that it is necessary for drillpipe suppliers and shippers to retain an extensive inventory of spacers.

It is among the objectives of embodiments of the present invention to obviate or mitigate this and other disadvantages of existing tubular handling systems.

According to the present invention there is provided apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members.

The invention also relates to a method of packaging elongate members.

The packing member is preferably in the form of a cross-member for extending between the frame side members.

Preferably more than one packing member is provided, and in preferred embodiments of the invention each elongate member (such as length of drillpipe or other tubular) is in contact with at least one packing member, It is preferred that a packing member overlies and underlies each elongate member such that, when the elongate members are secured within the apparatus, the force applied by the retaining means causes the upper and lower packing members to deform at respective upper and lower contact areas with the elongate member; the elongate members are thus gripped and retained by relatively large contact areas, produced by the deformation of the packing members.

Due to the deformability of the packing members the invention allows packaging of a range of elongate members diameters or shapes. Members to be transported or stored may be placed in the frames with a packing member above and beneath each layer of members between the side members. In order to grip the elongate members effectively, each layer of members should be uniform in diameter or geometry and dimensions, but different layers may have different diameters or geometries and dimensions.

Preferably, the deformable portion of the packing member is resilient.

The frame may be generally U-shaped, and may be provided as a unitary part comprising the base and upright sides, or alternatively, the base may be provided as a part which is separable from the two side members.

Preferably, two frames are provided, one for location towards each end of the elongate members. However, in certain applications of the invention a single U-frame may be used for securing one or more elongate members.

Where two frames are provided, the frames are preferably, but not necessarily, joined by at least one connector member. Preferably two connector members are provided and with the base members of the frames create a generally rectangular base frame. The connecting members between the two end frames may optionally have forklift protector plates to facilitate handling of the apparatus.

The connector members limit the force that packing members within each frame must exert on constrained members to maintain relative distance between the two frames. During lifts, the connector members maintain the frames in the same relative positions. The force necessary to maintain constrained member position is thereby limited to resisting rolling or sliding towards or perpendicular to the frames. The deformable portion of the packing member, which may be formed of an elastomer, may thus be adapted to accommodate a greater range of geometries and dimensions than practical when lifting forces directly affect the force applied between the packing members and constrained members.

The packing members may be positioned at any convenient height or spacing within the frames; the vertical position may vary depending upon the size of the elongate members beneath each packing member.

Each packing member is preferably restrained against movement parallel and perpendicular to constrained member length. This may be accomplished by means of channels on each side member which the packing members engage by means of rigid heads for location in the channels. The heads are preferably slidable in the channels. The side members thus restrict packing member motion perpendicular to constrained member length and the channels restrict packing member motion parallel to constrained member length. The channels also act to maintain packing member length, limiting cross-member bending under forces parallel to constrained member length. Of course other packing member restraining arrangements may be utilised, including providing channels or apertures in the packing member ends to cooperate with corresponding profiles or members on or associated with the side members.

Preferably, the retaining means is adapted to pull upper packing members towards the base, thereby providing sufficient vertical force to maintain the elongate members between the packing members in compression. A threaded rod may be attached at the base of each frame, and a nut drawn down on the rod, above the top packing member. In other embodiments, clamping levers or hydraulic or pneumatic rams may be utilised. Alternatively flexible members, such as straps, slings or chains may be draped over the uppermost packing member, optionally adjacent each side member, and mechanically tightened, for example by ratchets.

The packing member preferably comprises a rigid section, typically a rigid center section, which preferably provides resistance to motion in three axes: vertical, longitudinal and lateral. To this center section is bonded or otherwise fixed one or more deformable elements, preferably an elastomeric jacket. The bonding is preferably by thermal bonding of extruded elastomer or moulded elastomer. The extrusion form or mould may shape the elastomer into vertical and lateral profiles across the jacket length. These profiles are preferably symmetrically opposing with respect to the elastomer lateral and vertical centrelines.

The elastomer jacket vertical profiles on either side of the center section are optionally shaped to facilitate elastomer vertical and lateral displacement with increasing vertical compression. Under sufficient vertical compression, inclined lobes of the top and bottom halves, preferably symmetrical with respect to the vertical centreline of the center sections, may move together. Greater vertical force increases the displacement of the lobes towards each other.

The elastomer jacket preferably has side lobes and a central section, with one or more channels between the central section and the side lobes. The channels facilitate drainage of fluid from the jacket faces.

On the elastomer jacket top and bottom lateral profiles, vertical force exerted by the constrained elongate members deforms the elastomer, the degree of deformation increasing with increasing force. This deformation exerts pressure against the elongate member, where the elastomer is in contact with the member. The degree of pressure will vary with, for example, elastomer thickness above or below the lateral centreline, and with the magnitude of vertical force compressing the elastomer against the elongate member.

The elastomer jacket top and bottom lateral profiles in certain embodiments have angular edges that exert increasing compressive resistance to elongate member lateral motion with increasing applied vertical force. Opposing symmetry with respect to the lateral centreline achieves increasing compressive resistance to elongate member lateral motion in either direction. The elongate member is constrained by elastomer-enclosed or coated packing members above and below. If the friction co-efficient between the elastomer and the elongate member surface is sufficient, increasing compression-resistance force is imparted to the constrained member surface, preventing motion along longitudinal and lateral axes. Elongate member accelerative force is typically transferred to the center section. The elongate member, vertically constrained above and beneath between packing members, and by means of compression-resistance force prevented from motion in the two axes, is thereby maintained in position relative to the packing members.

Embodiments of the invention will now be described, by way of example only, and with reference to the accompanying drawings, in which.

Figure 1:
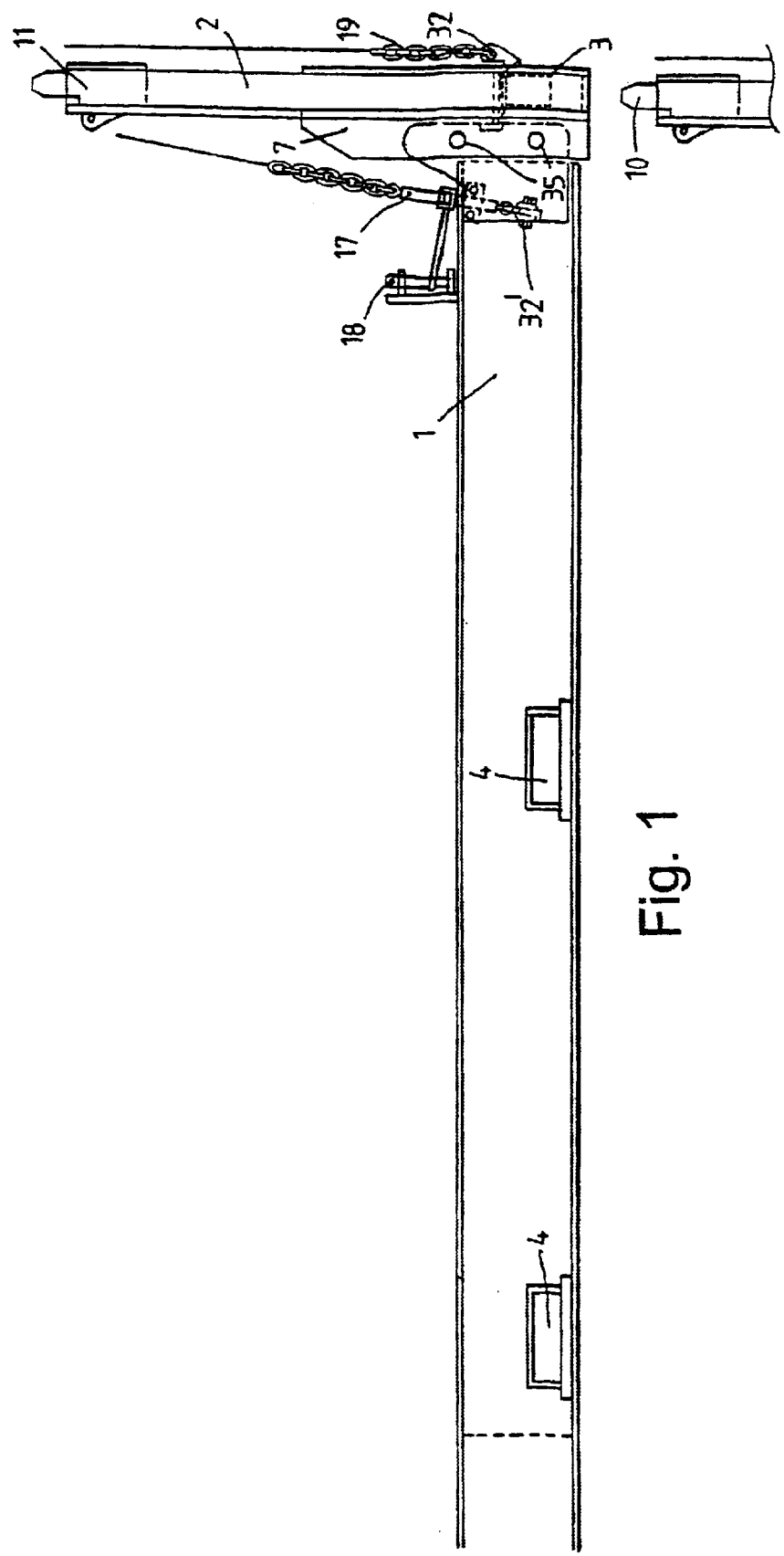
FIG. 1 is a side view of one end of apparatus according to a preferred embodiment of the invention.
Figure 2:
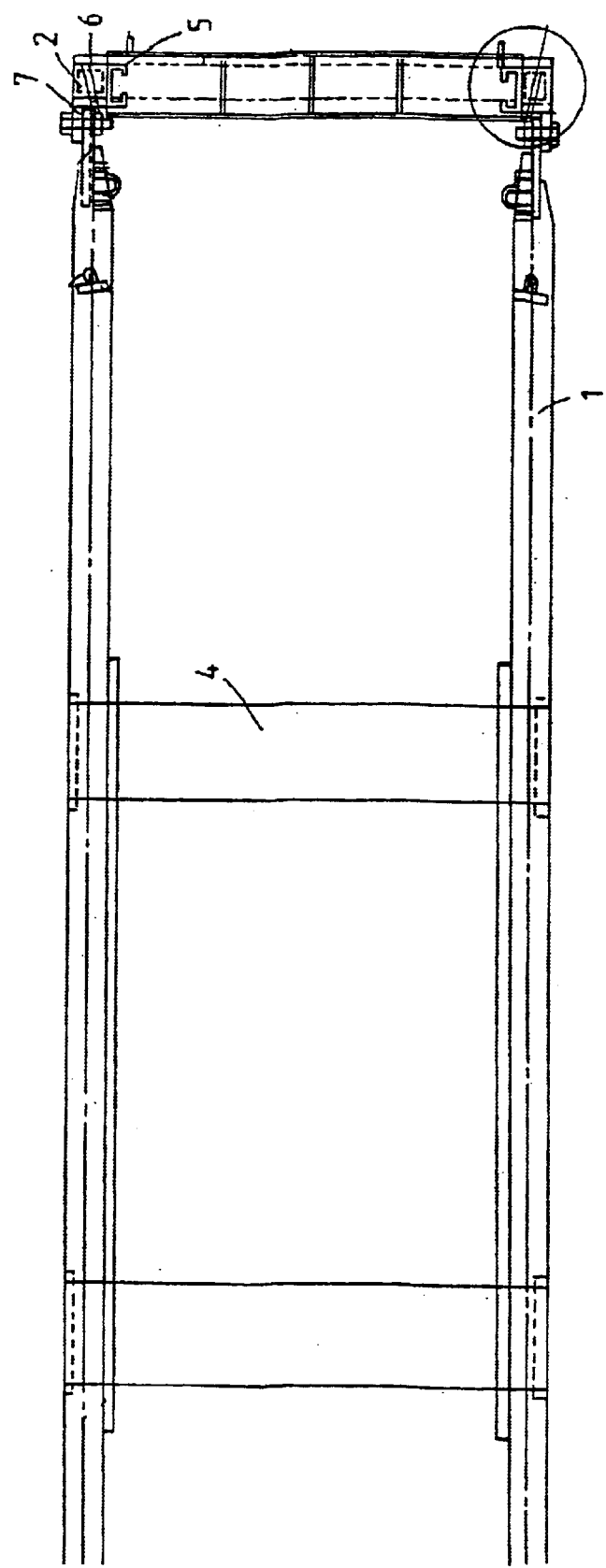
FIG. 2 is a plan view of the FIG. 1 apparatus.
Figure 4A:
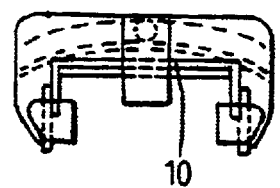
Figure 4B:
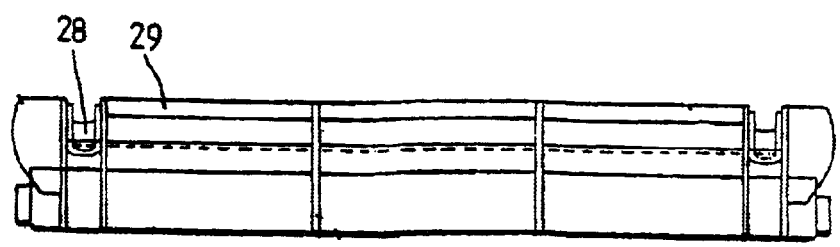
Figure 5:
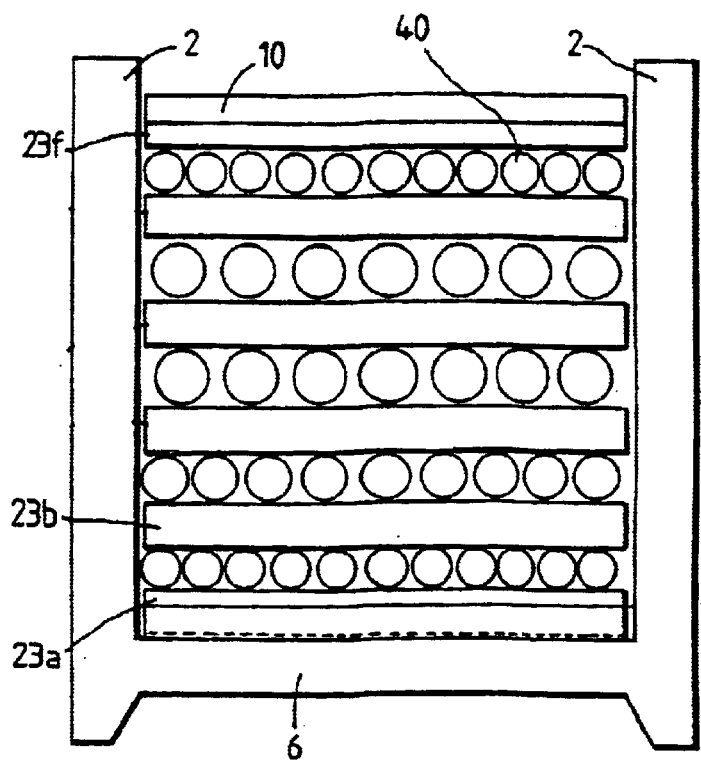
Figure 6:
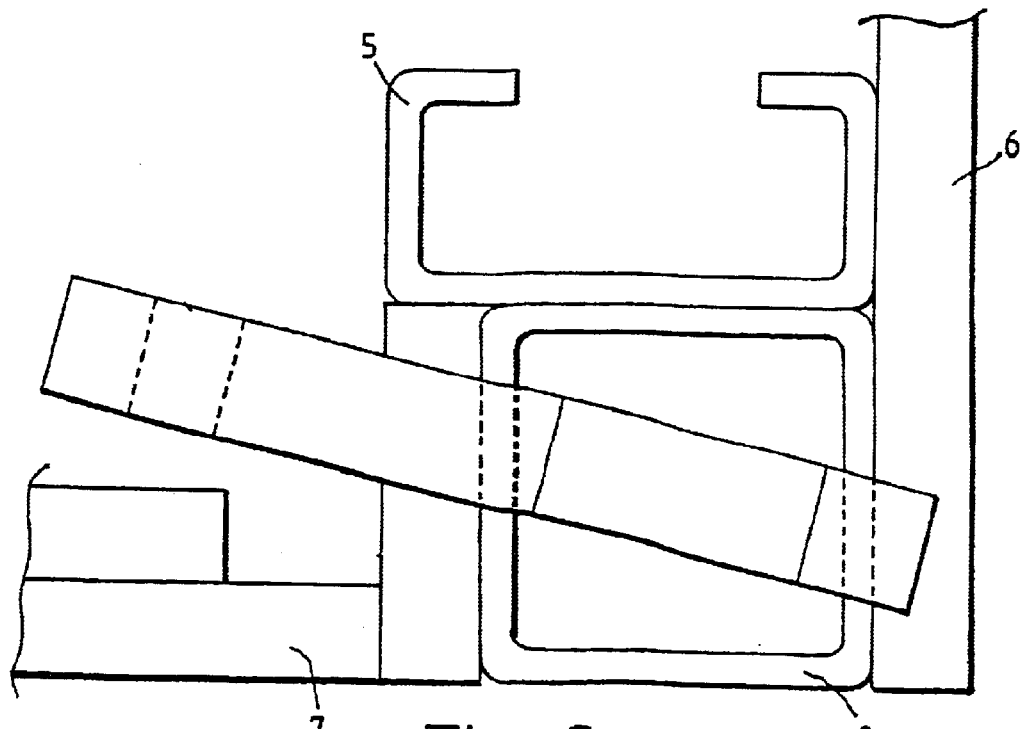
Figure 7:
Figure 8:
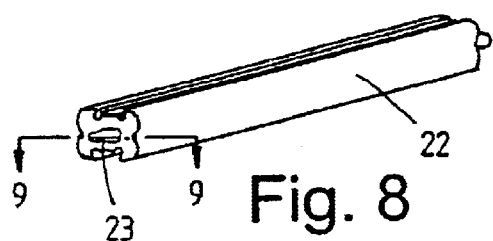
Figure 9:
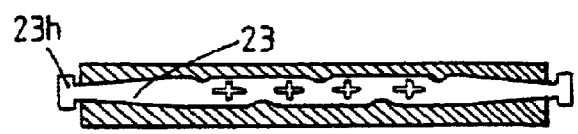

FIGS. 4(*a*) and (*b*) show end and side views of a top bar for the FIG. 1 apparatus;

FIG. 5 shows a schematic end view of a FIG. 1 apparatus loaded with pipe;

FIG. 6 is a detailed view of a corner portion of the FIG. 2 drawing;

FIG. 7 is a perspective view of an alternative embodiment of a top member;

FIG. 8 is a perspective view of an elastomeric-jacketed crossbar;

FIG. 9 is a section of view on line 9—9 of FIG. 8; and

Figure 10:
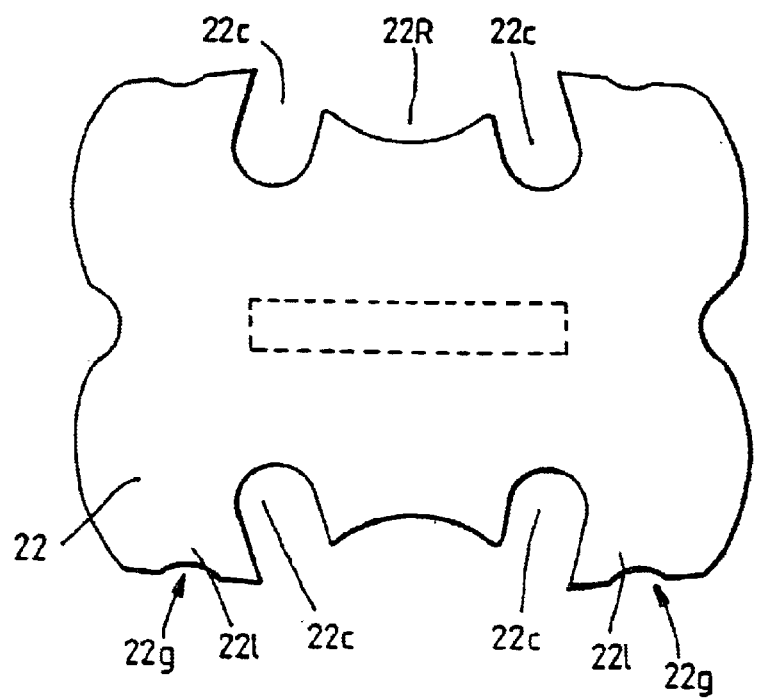

FIG. 10 is an end profile of the FIG. 8 crossbar.

Figure 3:
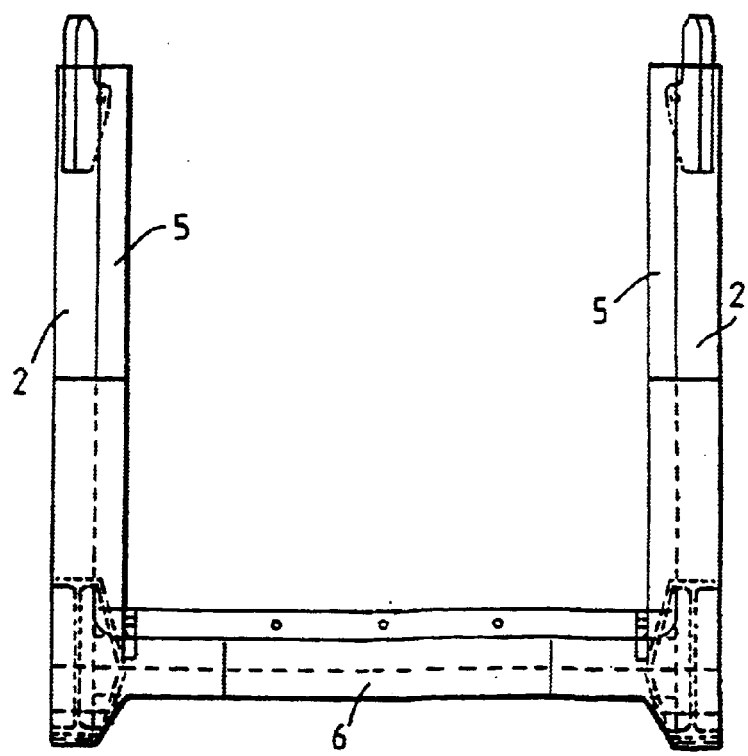
FIG. 3 is an end view of the FIG. 1 apparatus.

Referring now to the drawings, apparatus for packaging and carrying drill pipes and other tubulars comprises a generally U-shaped frame (FIG. 3) comprising a horizontal base member 6 attached to upright side members 2 having C-shaped channels 5 secured to their inner faces and oriented towards one another. Two frames are connected by members 1 (only one frame shown in FIGS. 1 and 2). The connector members 1 include forklift toe protectors 4 to enable the apparatus to be lifted more easily by forklift trucks. The connector members 1 are bolted at 35 to flanges 7 on the uprights 2, but may alternatively be connected by welding, or by fabricating as a single part, or by any other means suitable. At the base of each upright 2, a socket 3 is provided for locating a stacking lug 11 of a lower frame to allow stacking of loaded frames on top of one another.

The channels 5 are adapted to receive the head 23*h* of a crossbar 23 (FIGS. 8 & 9). The crossbar 23 is formed from steel and has a surrounding jacket 22 of elastomeric polyurethane or similar material, to create a deformable packing member. The heads 23*h* of the crossbars 23 are vertically movable in the channels 5 so that once the heads 23*h* have been located in respective channels 5, the crossbars 23 are free to move vertically (but in no other direction) in the frame.

The profile of the elastomeric jacket may take a variety of forms, although the jacket 22 as illustrated in FIG. 10 features the preferred profile. The jacket 22 has radiussed sides, and at least one channel 22*c* formed in its upper and lower surfaces. Each of the upper and lower surfaces of the jacket 22 has a pair of opposing lobes 221 upon which are provided grooves 22*g*, and a central ridge 22*r* is located between the two lobes 221, which ridge 22*r* is indented so as to present a concave surface. The jacket 22 may be moulded around the bar 23, but may also be extruded or formed thereon by any other means suitable.

In use, drillpipe lengths 40 are loaded onto the frames so that they lie on a crossbar 23 compressing and deforming the elastomeric jacket 22 at areas of contact. A layer of pipe lengths is laid across the lowermost crossbar 23*a* (FIG. 5), and a further crossbar 23*b* is then located, by its heads 23*h*, in the side channels 5 and slid down to rest on top of the layer of drillpipe lengths 40. A further layer of drillpipe lengths is then loaded onto the uppermost crossbar 23*b* and the process is continued until the desired number of pipes has been loaded or until the uppermost layer of pipes is approaching the upper ends of the channels 5; the uppermost member 23*f* can slide in the channels 5 and so the apparatus may only be partially loaded, if desired. A final crossbar 23*f* is then laid on top of the uppermost layer of drillpipe sections 40, and a top member or tie down bar 10 (FIG. 4) is then placed on top of the uppermost crossbar 23*f*.

The top member 10 locates into the side channels 5 in the same manner as the crossbars 23, and has curved channels 28 in its upper surface 29. A chain 19 (FIG. 1) fastened to a lug 32 at the base of each upright 2 is passed from the lug 32 over the top member 10, located in the channel 28 and over the arrangement of pipe lengths 40 and crossbars 23, to the opposite side of the upright 2, where it is connected to a ratchet tensioning mechanism 17 secured to a further lug 32' attached to the flange 7 or to a connector member 1 (or to any convenient point). The ratchet mechanism 17 is then tightened to exert a force on the top member 10 to further press the layers of pipe lengths 40 against the elastomeric jackets 22 on the crossbars 23. The resulting compression of the elastomeric jackets 22 indents the upper and lower surfaces of the jackets. The compression also causes the lobes 221 to move together toward the central ridge 22*r*, and any excessive force applied merely compresses the jacket 22 further. The grooves 22*g* and sides of the lobes 221 present angular faces to the pipe section 40, and restrict axial sliding movement of the pipe 401. If desired, the upper surfaces of the lobes 221 and ridge 22*r* may be faced with a high friction material so as to further reduce the possibility of slippage.

When the desired tension is reached on the ratchet device 17, the ratchet operating pin is tied off at 18 to prevent accidental release of tension, and then the packaged pipe and the frame can safely be transported, and stacked if necessary. A U-shaped frame is provided at each end of the connecting members 1 in the embodiment shown and the operation for loading and securing the pipe sections 40 is the same for each U-shaped frame.

It will be noted from FIG. 5 that the apparatus may accommodate pipe lengths of different diameters; the elastomeric jackets 22 simply deform to accommodate the different pipe forms, such that tubular producers, suppliers and shippers are not required to retain an inventory of different crossbars to accommodate different diameter tubular lengths. Further, the ability to accommodate different diameters in a single package allows for more efficient storage and transport of small batches of tubular lengths.

It will be recognised by those of skill in the art that the abovedescribed embodiments are merely exemplary of the present invention and that various modifications and improvements may be made thereto without departing from the scope of the present invention.

What is claimed is:

1. Apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members, wherein the at least one packing member comprises a rigid cross-bar and, said deformable portion is in the form of an elastomeric jacket surrounding said cross-bar.

2. The apparatus of claim 1, wherein the packing member comprises a cross-bar for extending between the frame side members.

3. The apparatus of claim 1, wherein at least two packing members are provided.

4. The apparatus of claim 3, wherein, in use, one of said packing members overlies and underlies each elongate member.

5. The apparatus of claim 1, wherein the deformable portion of the packing member is resilient.

6. The apparatus of claim 1, wherein the frame is generally U-shaped.

7. The apparatus of claim 1, wherein a second frame is provided, each frame being adapted for location towards a respective end of the elongate members.

8. The apparatus of claim 7, wherein the frames are joined by at least one rigid connector member.

9. The apparatus of claim 8, wherein two connector members are provided and with the base members of the frames create a generally rectangular base frame.

10. The apparatus of claim 8, wherein said rigid connector member between said frames has forklift protector plates to facilitate handling of the apparatus.

11. The apparatus of claim 1, wherein the packing member is adapted to be positioned at different heights within the frame.

12. The apparatus of claim 1, wherein the packing member is restrained against movement parallel and perpendicular to the length of the elongate members when engaged by the packing member.

13. The apparatus of claim 12, wherein the packing member has ends adapted to engage profiles on the side members.

14. Apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members, wherein the packing member is restrained against movement parallel and perpendicular to the length of the elongate members when engaged, wherein the packing member has ends which engage profiles on the side members, and wherein the packing member ends define rigid heads for location in channels defined by the side members.

15. The apparatus of claim 14, wherein the heads are slidable in the channels.

16. The apparatus of claim 1, wherein the retaining means is adapted to pull an upper packing member towards the base.

17. The apparatus of claim 16, wherein the retaining means comprises a mechanical tightening arrangement.

18. Apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members, wherein the retaining means comprises flexible members adapted to be draped over an uppermost packing member.

19. The apparatus of claim 1, wherein the elastomeric jacket defines vertical profiles on either side of the rigid cross-bar shaped to facilitate elastomer displacement with increasing vertical compression.

20. Apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members, wherein the packing member comprises a rigid section, said deformable portion comprises one or more elastomeric jackets fixed to the rigid section, each elastomeric jacket defining vertical profiles on either side of the rigid section shaped to facilitate elastomer displacement with increasing vertical compression, and wherein the elastomeric jacket defines displaceable lobes, upper and lower lobes of said lobes being on each side of the jacket and being relatively vertically moveable.

21. The apparatus of claim 20, wherein the elastomeric jacket defines side lobes and a central section, with one or more channels between the central section and the side lobes.

22. Apparatus for packaging elongate members, the apparatus comprising: a frame comprising a base and side members; at least one packing member engageable with the frame, the packing member having a deformable portion for engaging elongate members to be handled; and means for retaining the packing member in contact with the elongate members, wherein the packing member comprises a rigid section, said deformable portion comprises one or more elastomeric jackets fixed to the rigid section, and wherein each elastomeric jacket defines angular edges that are adapted to exert increasing resistance to elongate member lateral motion with respect to the packing member with increasing compression of said each elastomeric jacket by contact with one of said elongate members.

* * * * *